US008209047B2

(12) United States Patent
Dubesset et al.

(10) Patent No.: US 8,209,047 B2
(45) Date of Patent: Jun. 26, 2012

(54) TEACHING DEVICE FOR A CUTTING DIE AROUND PATTERNS PRINTED ON A FLAT PRINTING MEDIUM, CUTTING MACHINE PROVIDED WITH SUCH A DEVICE AND METHOD FOR IMPLEMENTING SAME

(76) Inventors: Didier Dubesset, Villejuif (FR); Eric Vilain, Athis-Mons (FR); Bart Vanhauwaert, Rotterdam (NL)

( * ) Notice: Subject to any disclaimer, the term of this patent is extended or adjusted under 35 U.S.C. 154(b) by 690 days.

(21) Appl. No.: 12/305,615

(22) PCT Filed: Jun. 29, 2007

(86) PCT No.: PCT/FR2007/001101

§ 371 (c)(1), (2), (4) Date: Dec. 18, 2008

(87) PCT Pub. No.: WO2008/000965

PCT Pub. Date: Jan. 3, 2008

(65) Prior Publication Data

US 2009/0282958 A1 Nov. 19, 2009

(30) Foreign Application Priority Data

Jun. 29, 2006 (FR) ..................................... 06 05841
Jun. 28, 2007 (FR) ..................................... 07 04691

(51) Int. Cl.
*G06F 19/00* (2011.01)
*B26D 5/32* (2006.01)

(52) U.S. Cl. ........... 700/125; 700/124; 700/134; 83/13; 83/72; 83/76.6

(58) Field of Classification Search .................. 700/116, 700/124, 86, 167, 108, 125, 176, 134; 83/13, 83/72, 73, 76.6, 76.8, 669
See application file for complete search history.

(56) References Cited

U.S. PATENT DOCUMENTS 5,074,178 A * 12/1991 Shetley et al. .................... 83/47

FOREIGN PATENT DOCUMENTS

| | | | |
|---|---|---|---|
| DE | 3433298 | * | 3/1986 |
| GB | 2270604 | | 3/1994 |
| JP | 2006068821 | | 3/2006 |

OTHER PUBLICATIONS

International Search Report dated Jan. 1, 2008, in PCT application.

* cited by examiner

*Primary Examiner* — John R. Cottingham
*Assistant Examiner* — Steven Garland
(74) *Attorney, Agent, or Firm* — Young & Thompson

(57) ABSTRACT

The purpose of the invention is a control device for handling mobility elements of a cutting tool (1) and/or a carrier device of a flat printing medium (2) whereon an inscription has been previously printed. The device includes teaching elements (9) for reading information (10) transmitted via reading means (5) which are associated with elements (14, 18) for comparing between the reading information (10) and the instruction information (15, d, D, C) previously stored in memory relating to the definition of the inscription (3, 4) from a density of pixels and/or the framing of the inscription (3, 4) from a relative position between two (3, 4) at least.

20 Claims, 5 Drawing Sheets

TEACHING DEVICE FOR A CUTTING DIE AROUND PATTERNS PRINTED ON A FLAT PRINTING MEDIUM, CUTTING MACHINE PROVIDED WITH SUCH A DEVICE AND METHOD FOR IMPLEMENTING SAME

TECHNICAL FIELD OF THE INVENTION

The present invention belongs to the field of devices for handling and controlling cutting machines or devices, notably applicable to the cutting of a flat printing medium, such as a sheet or a plate, around at least one pattern previously printed on this printing medium. Its subject is a device for controlling the handling of mobility means of a cutting tool and/or of a carrying device for the printing medium to separate the pattern from the printing medium and/or to form embrittlement lines at least partially around this pattern, a cutting machine equipped with such a control device and a method for cutting a flat printing medium around at least one pattern previously printed on said printing medium.

STATE OF THE ART

In the field of printing, it is known to print on a flat printing medium a plurality of patterns then to cut this printing medium around the pattern to separate them from each other. The expression "flat printing medium" will be understood to mean a printing medium in the form of a plate liable to present a natural resistance, or a sheet printing medium liable to be flexible, such a sheet possibly being conditioned and handled in a roll. Such a printing technique is notably applied to the field of photography or similar, such as for posters or other similar display media. For example, photographs or more generally patterns are printed in plurality on the printing medium by being distributed over its surface. Commonly, these patterns comprise an outline of regular geometrical form, notably in a rectangle, and are likely to be of the same size or of respective sizes for one and the same printing medium. Such patterns are also likely to comprise an outline of complex form, such as comprising at least partially curved areas.

The general problem arises of how to cut the printing medium around the patterns. For this, cutting appliances are implemented, that are either incorporated in the printing machine, or are separate from the latter. More specifically, the printing machine in general comprises a carrying device for the printing medium, means of printing the patterns on the medium, and printing control means for implementing the printing means. These printing control means are notably means associated with first programming means making it possible to create a printing program. The cutting appliance generally comprises a carrying device for the medium, such as a table, a rotating roll or similar carrying device, cutting means mainly comprising a cutting tool carried by a chassis positioned directly above the carrying device, and cutting control means for implementing means of moving the cutting tool and/or the carrying device for the medium notably in the two directions corresponding to the general plane of the printing medium. These cutting control means are notably means associated with second programming means making it possible to define a cutting program. Where appropriate, the first and second programming means are combined, so as to enable an operator to create a printing program and a cutting program from one and the same programming tool.

More specifically, there arises the difficulty of correlating the printed pattern defined by the first programming means and the implementation of the mobility means for cutting the pattern. Such a correlation is necessary to obtain a cut around the pattern that guarantees the integrity of the latter. This problem is all the more difficult to resolve in the case where the cutting appliance is not incorporated in the printing machine, with as corollary the need to provide an identification relative to the cutting tool of the position of the printing medium, and more particularly of the patterns that it comprises, when transferring the printing medium from the printing table or similar to the cutting table or similar. Such an identification is also useful in the case where the printing medium is flexible and without natural resistance, with the consequential possibility of maintaining the medium on the cutting table that is likely not be strictly flat.

To overcome this difficulty, it has been proposed to print identification marks in proximity to the patterns at the same time as the latter are printed. The cutting appliance is equipped with optical means of reading these marks, which transmit identification information items to the second control means. These information items enable the second control means to have initialization information on the position of the cutting tool relative to the real position of the pattern or patterns to be cut, and deduce therefrom the information needed for the cutting program to define the actual displacements that the cutting tool and/or the carrying device for the medium must make in light of a cutting program initially created by an operator. More specifically, an operator defines from first programming means the form and the nature of the pattern or patterns to be printed. At the same time, this operator defines from first programming means the printing of a plurality of identification marks positioned in proximity to the pattern or patterns at a predetermined distance. Then, the operator defines from second programming means the path that the cutting tool must travel around the pattern or patterns. Once the separate programming operations have been performed, the printing machine performs the printing of the pattern or patterns and the printing of the identification marks. Then, either the medium is maintained on the table in the case where the machine is equipped with the cutting appliance, or the medium is transferred to a specific cutting machine. Then, the optical reading means are implemented to identify the position of the identification marks, and transmit these identification information items to the second control means, in which are incorporated the second programming means comprising the cutting program previously created by the operator. The second control means then correlate the identification information and the cutting program information to define the implementation of the mobility means for the cutting tool.

To learn about an environment that is technologically similar to the present invention, reference can be made to the following documents: JP2006/068821 (GRAHTEC KK), GB2270604 (GERBER GARMENT TECHNOLOGY INC), FR2597390 (ONERA), FR2687091 (AEROSPATIALE), CA2526123 (MIMAKI ENG KK) and WO2005108027 (MIKKELSEN GRAPHIC ENG. et al.)

One drawback of such a method lies in the difficulty of correlating the printing program and the cutting program. This difficulty is made all the more difficult to overcome as more and more printing programming software packages come onto the market with consequential problems relating to compatibility between the printing programming software and the cutting programming software. Furthermore, this correlation is a source of frequent errors, with the consequence for the operator of having to recover the information from the cutting program, such a recovery possibly even being repeated. This recovery is all the more prejudicial as it is commonplace in the field for the operators to work in a hurry. Moreover, in the case where the cutting appliance and the printing machine are not part of the same machine, there is the problem of establishing a computer correlation between them.

To overcome this problem, it has been proposed by DE3433298 (BAUMANN GEORGE DR ING) to provide the cutting control means with means of learning reading information transmitted by optoelectronic means. These reading information items relate to the inscriptions printed on the printing medium, and are analyzed by recognition means to identify a density of pixels revealing the presence of an inscription. Such an identification is notably performed from an analysis of brightness and/or a contrast reflected by the printing medium. The reading information relating to the densities of pixels is processed by recognition means comprising a data storage matrix generating vector cutting information relative to an origin point. From the data stored in the matrix, the vector information items are deduced by transcription to control the cutting, and more particularly to control the displacement of the cutting tool and/or of the carrying device for the printing medium.

There arises the problem of the reliability and the relevance of vector information items, which are likely to be corrupted by the methods of capturing the reading information and processing them to arrive at the vector information. The complexity and the large number of calculation operations needed to arrive at the production of the vector information require the use of calculation means of suitable power. It is, however, desirable for the control means to be able to handle the cutting tool and/or the carrying device for the printing medium as rapidly as possible. This speed of handling of the cutting tool is likely to be obtained by limiting the calculation operations required without in any way increasing the difficulty and the number of tasks that must be carried out by the operator of the cutting machine, and more particularly of the control means. Such a limitation on the calculation operations must not be obtained at the cost of the reliability and the relevance of the vector information items supplied by the transcription means associated with the recognition means, and must be able to be obtained from calculation means of simple and inexpensive design, so as not to prohibitively increase the overall cost of the control device. The implementation of these calculation means must be user-friendly based on operations that are simple to carry out, to allow for a rapid and easy use of the control device by any operator, including by a person inexperienced in the field of control means. Furthermore, the speed with which the tool is likely to be operated can be obtained by best organizing the operating methods of the cutting device and notably the implementation of the means that it comprises, from the installation of the printing medium on the cutting machine through to the communication of the vector information items to the cutting tool handling means.

It emerges from this that the control means merit improvement in order to satisfy all these requirements, to ultimately propose to an operator control means whose competitiveness is based on tolerable costs and a user-friendliness of operation allowing them to be implemented by personnel not specializing in the field of programming.

SUBJECT OF THE INVENTION

The aim of the present invention is to propose a method for cutting a flat printing medium around patterns previously printed on this printing medium, a device for controlling the handling of mobility means for a cutting tool and/or a carrying device for the printing medium implementing such a method, and a cutting machine equipped with such a control device. The present invention more particularly targets proposing such method, device and machine, that offer a satisfactory solution to the stated requirements and problems to be resolved, based on a use of means of learning reading information items in order to have them transcribed into vector information, such learning means being chosen to avoid difficulties relating to the correlation between a printing program for the patterns and a cutting program for these patterns. An even more particular aim of the present invention is to propose such method, device and machine that make it possible to obtain a cutting of the printed medium rapidly and by limiting the calculation operations needed when the device is implemented, based on an astute organization of the methods of implementing the various means that the device comprises.

The device of the present invention is a control device for handling at least one tool for cutting a flat printing medium and/or a device carrying the printing medium, such as a table, a roll or similar. This control device is intended to be fitted on, or even be part of, a machine for cutting the printing medium on which have been previously printed at least one pattern to be cut and, if necessary, at least one identification mark of said pattern. This control device notably implements means of controlling means of moving the cutting tool and/or the carrying device for the printing medium based on a cutting program relating to vector information. These vector information items notably correspond to information items relating to the two general dimensions of the printing medium. The cutting tool is notably supported by a chassis via mobility means enabling a displacement of the cutting tool according to the two dimensions of the printing medium. The carrying device for the printing medium is likely to be of the type incorporating mobility means for displacing the printing medium relative to the cutting tool, such as of the rotating roll type or similar carrying device. Such control means more particularly comprise programming means associated with reading means which are in turn associated with means of recognizing information items relating to an inscription previously printed on the medium. The reading means can notably be maneuvered above the printing medium in the two general dimensions of the latter, advantageously being supported by said chassis via mobility means of the cutting tool. More particularly, but in a non-limiting way, the mobility means of the cutting tool and the mobility means of the reading device are advantageously combined. The reading means are preferably means of the optoelectronic type, notably implementing an optical sensor for detecting the intensity of a reflected light signal or an optical image reading appliance, video camera, scanner or similar appliances in particular. However, and without departing from the framework of the present invention, the reading means are likely to comprise means of the electromagnetic type or other similar electronic reading types, if necessary to read identification marks that are in this case of a corresponding type.

The control means comprise means of learning the reading information that are associated with means of transcribing the reading information learned as vector information of movement of the cutting tool and/or the device carrying the printing medium for creating the cutting program on the fundamental basis of the reading information.

These provisions are such that the control means generate the cutting program from the information transmitted by the reading means, these information items being stored in memory as cutting data that is transcribed into vector information items. The generation of the cutting program is exempt of programming information previously constructed by an operator according to printing information relating to the pattern, the cutting program being directly created from the cutting data that in itself defines a trajectory of the cutting tool and/or a mobility of the carrying device for the printing medium, and that is supplied by the learning means. The result of this is that the operator is freed from the task of creating a cutting program that is fundamentally constructed from the reading information, with the advantage of a gain in production and efficiency.

The recognition means are means of identifying reading information relating immaterially to the pattern and/or to at least one identification mark of said pattern. For example, the reading means are likely to be of the type enabling a recognition of a contrast reflected by the printing medium, for the recognition of the pattern to be cut and from cutting data relating to a printed surface corresponding to the pattern. For example, the reading means are likely to be of the type allowing for a recognition of the presence of a previously identified identification mark, such as a point, a bracket, a cross or similar mark. In this case, the position and dimension characteristics of the pattern or patterns to be cut are likely to be identified from a recognition of the relative position of such identification marks relative to each other. The patterns to be cut are likely to be identified from a recognition of an identification mark identifying, in proximity to or strictly, the pattern to be cut.

The inventive approach of the present invention consists in using comparison means to confront the reading information with set-point information previously stored in memory relating to definition information and/or typical framing information. The definition information items notably relate to the scale of a density of pixels revealing typical characteristics of the inscription, such as a contrast threshold, a line thickness, a looped closure of the inscription on itself and/or its overall geometrical shape or other similar characteristics relating to a form and/or thickness of the inscription. The framing information items notably relate to the position of a plurality of inscriptions relative to each other revealing typical characteristics concerning a separation distance between at least two inscriptions, making it possible, for example, to define a separation distance between a pattern to be cut and an identification mark, or even the format of an inscription forming a pattern to be cut.

The comparison means are means able to deduce vector information from the confrontation between the reading information and the definition information and/or framing information previously stored in memory, without this definition information and/or framing information being determinant and prejudicial before this confrontation of the size and/or of the position of the patterns to be cut on the medium. More particularly, from the reading information and by confrontation with the definition and/or framing information, the patterns to be cut are recognized in dimensions and in positions, and the vector information items are generated by the transcription means. The relevance of the reading information items is verified, and the vector information items are deduced by the comparison means from definition and/or framing information items commonly used in the field of printing that are previously stored in memory and cataloged, even extemporaneously modifiable by an operator to enrich this catalog.

The vector information items are deduced from a simplified analysis of the reading information items relating to an inscription revealing a pattern to be cut. The control means can be easily organized so as to offer a user-friendly operation accessible to a person who is inexperienced in the field of programming control means. More specifically, and according to a subsidiary aspect of the invention, the definition and framing information items are easily input by an operator selectively from user-friendly menus, according to extemporaneous requirements. From this input of definition and/or framing information items, of which are exempt any vector information items relating to the displacement of the tool and/or to the carrying device for the printing medium relative to a reference position, and/or any information relating to the position of the patterns on the printing medium relative to each other, the comparison means are able to deduce and generate the necessary vector information items.

Furthermore, the control means are able to incorporate complementary calculation means such as probability and/or neural networks or similar, the operation of which is limited to the processing of the reading information compared to the definition information and/or to the typical framing information. Notably, from the probability means, the confrontation between the reading information items and the definition information items and/or framing information items make it possible to define the vector information as a consequence of an analysis between the reading information items and their relevance in light of the definition and/or framing information items previously stored in memory by the operator. A deduction of the position and form of the patterns on the printing medium can be performed by the probability means from the definition and/or framing information items indicating the potential presence of these patterns without specifying their relative positioning on the printing medium.

According to a general definition of the present invention, the recognition means are notably associated with comparison means between the reading information and set-point information previously stored in memory relating to the definition of the inscription from a density of pixels and/or the framing of the inscription from a relative position between at least two inscriptions. The comparison means are notably means able to confront the reading information identifying any one inscription at least and the definition and/or framing information items previously stored in memory and able to deduce from this confrontation the vector cutting information relating to the displacement of the cutting tool and/or of the carrying device for the printed medium.

These comparison means more particularly comprise at least any one of first comparison means between the identification information that is obtained from the reading information and that relates to at least one typical characteristic of the inscription and definition information items that are previously stored in memory and that relate to said typical characteristics, and second comparison means between position information that is obtained from the reading information and that relates to at least any one of a separation distance between them of a plurality of inscriptions and/or of an outline to be cut, and typical framing information previously stored in memory relating to a said distance.

The information items and/or typical characteristics of the inscription lie in an information item and/or a characteristic relating to a classified current definition of the inscription, such as a contrast threshold, a line thickness, a looped closure on itself of the inscription and/or a geometrical form of this inscription, for example, or other similar information and/or typical characteristics. More specifically, the first comparison means are associated with first means of processing a typical identification information item relating to at least any one of the characteristics comprising a contrast threshold reflected by the printing medium, the thickness of a line forming the inscription, the looped closure on itself of this line, and/or the form of the inscription. The reading means are displaced by the corresponding mobility means so as to scan the surface of the printing medium. Out of all of the inscriptions read by the reading means, notably consisting of the pattern or patterns and, where appropriate, of the identification mark or marks in the case of a reading appliance of the optoelectronic type, the first comparison means are able to isolate the pattern or patterns and/or the identification mark or marks from all the read information items, from a comparison between these read information items and the definition information items previously stored in memory.

Secondly, said first processing means comprise a neural network making it possible to ensure the reliability of the information relating to the typical characteristic or characteristics of the inscription that are read by the reading means and transmitted to the learning means, such as from a comparison between a density of pixels read by the reading means and an accepted threshold of such a density to validate the relevance of the information read.

The information and/or typical framing characteristics lie, for example, in an information item and/or a characteristic relating to a current and standardized image format, notably in the field of photographic reproduction, even an image format previously input by an operator. The position information items are compared to the typical framing information items corresponding to a previously defined format, without the position of such a format on the printing medium being specifically previously defined by the programming means, and notably by an operator using the programming means. The implementation of such means is more intended for the cutting of patterns with a simple and recurrent outline, such as an outline of regular circular and/or polygonal, and notably rectangular, form. More specifically, the second comparison means are notably associated with second means of processing a position information item defining an outline to be cut from at least any one of said separation distance and a density of printed pixels delimiting such an outline.

The second comparison means are preferably associated with probability calculation means between the position information transmitted by the reading means and a plurality of framing information items previously successively stored in memory, notably from an input of these framing information items by an operator. These probability calculation means are more specifically intended to define the cutting program by comparing position information items notably relating to a definition and to a location of the form of at least one outline to be cut, with framing information items previously stored in memory, in a workshop or from an input of these information items by an operator.

More particularly, the probability calculation means comprise first calculation means for deducing a framing information item from a proximity detected between reading information items relating to identification marks. This proximity is compared with a framing information item previously input to reveal its relevance. Secondarily, and advantageously, from the input of a succession of framing information items performed by the operator, without in any way having the respective position on the printing medium of these framing information items being defined or prejudged by the operator, the means of determining a framing information item evaluate this respective position from a confrontation between the position information items and the framing information items previously stored in memory.

Even more particularly, the probability calculation means comprise second calculation means for correcting a framing information item deduced from a confrontation between this deduced framing information item and a framing information item of similar value previously stored in memory.

The aim of the use of said first and second processing means is to favor the speed of implementation of the control device from a reduction and/or a simplification of the necessary calculations that the control means must apply from the reading information transmitted to the control means, and more particularly to the learning means and/or to the processing means.

At least any one of the first comparison means and of the second comparison means is notably associated with means of input by an operator of input information relating to at least any one of the definition information items and of the framing information items. It will be noted that these input information items are information items of dimensional values exempt of any location information on the printing medium. Such an input is likely to correspond to an input of dimensional values relating to at least one definition and/or framing information item.

According to a preferred embodiment favoring the ergonomics of the device, the input means are associated with means of selection, by an operator, of at least one input information item out of a plurality of input information items previously stored in memory. More particularly, the operator has a menu proposing a plurality of definition and/or framing information items previously stored in memory, from which he selects the information item to be compared to the information items transmitted by the reading means.

Where appropriate, the control means comprise means of reducing the deviation of the relative position between at least one identification mark and a corresponding pattern. These deviation reduction means are notably means of correcting vector information items created by the transcription means according to a predefined separation distance between the identification mark and the pattern. The input means enable an operator to store in memory an information item relating to said separation distance between inscriptions.

The control device notably implements means of driving the displacement of the reading means and/or of the carrying device of the printing medium from a reading program relating to vector reading information. The driving means are advantageously associated with the learning means and are able to generate vector reading information from at least one reading information item previously detected during one and the same learning cycle and confronted with the set-point information.

In one and the same learning cycle, the association between the learning means and the driving means make it possible to generate successively vector reading information items according to the prior detection of at least one reading information item. The creation of the reading program is performed by the driving means progressively, from a deduction of the position to which the reading means and/or the carrying device for the printing medium must be displaced. This deduction is obtained during one and the same learning cycle, by using at least one detected reading information item and the set-point information items relating to the definition of the inscription and/or to the framing of this inscription.

One or more reading information items are confirmed as relevant from their confrontation with the set-point information items, this relevance corresponding to the presence of an inscription and/or a pattern to be cut. These reading information items are compared to at least one of the set-point information items to generate a vector reading information item. To create the cutting program from the learning means, the displacement means are driven so as to analyze the medium in at least one direction corresponding to the two dimensions of the printing medium. A confrontation between the relevant reading information item or items and the set-point information items frees the learning means of having to analyze all of the surface of the printing medium. The cutting program is obtained from a partial analysis of the surface of the printing medium by the learning means, this partial analysis being sufficient to generate reading information items confronted with at least one of the set-point information items to deduce the reading program and the cutting program.

More particularly, the driving means are associated with the comparison means and are able to generate a vector reading information item from the confrontation between a reading information item and at least one set-point information item.

The driving means are preferably able to generate a vector reading information item corresponding to a step and/or direction a predetermined from at least one, otherwise a combination of, reading information items revealing an absence of inscription. The driving means are also preferably able to generate a vector reading information item corresponding to a distance and/or a direction deduced by confrontation between at least one, otherwise a combination of, reading information items revealing an inscription and confronted with the set-point information.

Preferably, the device comprises means of deliberately implementing the learning means by an operator on a displacement of the reading means. The operator can, if necessary, order a learning and an analysis of the reading information items when the reading means are displaced and the learning means are not implemented by default. Such an absence of implementation of the learning means occurs notably when the reading means are displaced to a starting position of a future trajectory according to which the learning means are then implemented for the processing and analysis of the reading information items by the recognition means and the comparison means.

Another subject of the invention is a method for cutting a flat printing medium around at least one pattern previously printed on this printing medium. Such a method is notably of the type comprising the preliminary step of printing at least one inscription, notably at least one pattern and/or at least one identification mark printed in proximity, remotely or combined with the outline of such a pattern. This method implements means of reading this inscription associated with means of learning this inscription and means of transcribing the learning information into vector information controlling the mobility of the cutting tool and/or of the carrying device for the printing medium, the implementation of which is placed under the dependency of control means such as have just been described.

More particularly, such a method is mainly recognizable according to the present invention in that it consists in performing the following steps:

a) performing a read of the surface of the printing medium from a displacement of the reading means along this surface. This operation consists more particularly in ordering a displacement of the reading means via corresponding means of controlling the implementation of mobility means of the reading means. These mobility means are likely to be combined at least partially with the cutting tool handling means.

b) transmitting the reading information to the learning means to generate cutting data relating to identification and/or framing information of the inscription at least. Such a transmission of information items likely to take place by wire or by remote information transmission communication means. The cutting data correspond in particular to a form or outline to be cut, which is defined from the information items transmitted by the reading means. This transmission of reading information items is immaterially carried out continuously as the reading means are displaced and/or performed on completion of this displacement.

According to similar embodiment variants, the transmission of the reading information items is stored in memory by the learning means either prior to or after the processing of these reading information items by the recognition means. These two variants are equivalent in that the learning means are intended to store in memory information items relating to the inscription formed by a pattern and/or, where appropriate, at least one identification mark, in order to produce cutting data enabling the transcription means to generate the cutting program by determination of vector information items that are able to provoke the displacement of the cutting tool and/or of the carrying device for the printing medium, and in that the trajectory of these units is defined according to a kinematic generated only from reading information items that are processed by the comparison means and learned, or that are learned and then processed by the comparison means. The processing of the reading information items transmitted by the reading means notably consists in isolating and extracting from all of the reading information items the identification and/or position information items that are then used by the recognition means.

c) transmitting the cutting data to the transcription means to generate the cutting program. The cutting information items transmitted to the transcription means relate to an outline to be cut, such an outline having been fundamentally defined from a processing of the reading information items by the comparison means.

d) controlling the implementation of the mobility means of the cutting tool and/or of the carrying device for the printing medium, from the vector information of the generated cutting program.

The operation for generating cutting data consists more particularly in identifying an outline to be cut from at least any one of the operations consisting in identifying the inscription by comparison of the reading information items with the definition information items, and in identifying a format by comparing the reading information items with the framing information items. The comparison of the reading information items is performed with at least any one, and preferably, where appropriate, successively, of the first comparison means and the second comparison means. The control means of the present invention are likely to incorporate, in isolation but preferably in combination, at least any one of the first and second comparison means.

According to a first example of operation, the general form of at least one pattern to be cut is defined from a reading of the printing medium and from a recognition of this pattern by recognition of contrasting areas of the printing medium, likely to take into account areas distant by a tolerable deviation between two substantially equivalent contrast areas.

According to a second example of operation implementing at least one identification mark, the latter is a line closed in a loop on itself around a pattern to be cut. This line is likely to be slightly distant from, or be combined with, the outline of the pattern in the case in particular where such an outline does not reflect a sufficient contrast in light of the accepted threshold. This identification mark is identified from all the information items transmitted by the reading means to the learning means, from its continuity and/or from the thickness of its line that has been previously defined and stored in memory. Such a mode of operation is better suited to the cutting of a pattern of complex form, the outline of which is likely not to reflect a sufficient contrast variation.

According to a third example of operation, the recognition means are means of processing at least one group of a plurality of identification marks assigned to a pattern to a cut, such a pattern notably being a pattern of simple form, such as of regular polygonal or circular form. For example, for a rectangle, the identification marks are likely to be in the form of brackets arranged at the corners of the pattern. The identification marks are identified from all the information items transmitted by the reading means to the learning means, from their form, bracket for example, and/or from the thickness of their line and/or from a deviation separating them. The separation distance or distances between the identification marks define an outline corresponding to the cutting data. Since the format of such an outline is likely to be standard, a plurality of such standard formats previously stored in memory is likely to be compared to the outline defined by the recognition means. The probability calculation means are likely to estimate the relevance of the defined outline, and above all make it possible to determine the position on the printing medium of an outline from a plurality of outlines defined and assigned to different patterns, provided that an operator previously inputs the respective number, even the size and/or the category and/or the general standard form of the outlines to be defined.

To optimize the speed performance levels of the control means, the method comprises, where appropriate, the operation consisting in storing in memory, prior to the operation for transmitting cutting data to the transcription means, notably from an input performed by an operator, at least any one of the definition and/or of the framing information items. It will be noted that, for framing information items corresponding to standard formats, these framing information items are likely to be stored in memory in the workshop, that is, prior to the provision of the control device and/or of the machine equipped with this control device to the operator. Such framing information items stored in memory in the workshop are preferably modifiable and then storable in memory by the operator. It will be understood that the benefit of the present invention lies in the use of the comparison means but that their presence forms no obstacle to an operation of the control means from which an implementation of the comparison means is excluded.

The operator performing the programming of the cutting machine to create the cutting program is likely to be an operator not specializing in the field of programming, because of the fact that the procedures needed to create the cutting program are limited to the implementation of the reading means and, secondarily, to the input, notably via proposed menus, of simple information items relating to the definition information items and/or the framing information items, then, where appropriate, to an all-or-nothing operation to validate the established cutting program which is preferably viewed from display and/or printing means associated with the control means.

According to the advantageous methods of operation of the device relating to the association of the driving means with the learning means, there is proposed a method comprising the operations consisting in:

- detecting a first reading information item relating to an inscription, or in a similar manner, a first group of reading information items likely to indicate an inscription,
- confronting this first reading information item with at least one set-point information item and deducing therefrom a vector reading information item.

More particularly, from an initial positioning of the reading means and/or of the carrying device for the printing medium relative to each other, the method comprises the operations consisting in:

- generating a first vector reading information item and transmitting to the learning means the reading information acquired to deduce therefrom the presence or otherwise of at least one inscription,

- in case of an absence of inscription, generating a second vector reading information item according to a predetermined step and/or a direction, by default without acquisition of reading information, otherwise selectively by the operator with reading acquisition, and generating a third vector reading information item by transmitting to the comparison means the reading information acquired to deduce therefrom the presence or otherwise of at least one inscription,
- in case of a presence of inscription, confronting the reading information with at least one of the set-point information items and generating a fourth vector reading information item taking into account the recognition of this inscription in light of its definition and/or its framing, and transmitting to the transcription means the acquired reading information.

The first vector reading information item and the third vector reading information item correspond notably to a displacement of the reading means and/or of the carrying device for the printing medium according to a first direction corresponding to at least one dimension of the flat printing medium. The second vector reading information item and the fourth vector reading information item correspond notably to a displacement of the reading means and/or of the carrying device for the printing medium according to at least one second direction transversal to the first direction.

A cutting machine based on the present invention is a machine for cutting at least one pattern printed on a flat printing medium, and is mainly recognizable in that it comprises control means such as have just been described.

The reading means that this machine comprises are preferably reading means of the optoelectronic type. However, these reading means can comprise reading means of another type, such as of the electromagnetic type or other similar types of means of reading an identification mark. In this case, it will be understood that the operation for printing the identification mark corresponds to any other operation aiming to provide on the printing medium an identification mark of a type corresponding to the type of reading means used. It will be noted in this regard that, in as much as no correlation is made for the identification of the pattern between a reading of the pattern and a reading of the identification mark, this identification mark is likely to be of a different nature from the printed pattern.

The inventive cutting machine is likely to be either a standalone cutting machine, or be a cutting machine associated with printing means for printing on the printing medium at least one inscription, notably a pattern and, where appropriate, an identification mark.

It will be noted that, in the case where the cutting machine is a standalone machine, the usual problems of the area relating to the positioning of the printed pattern relative to the cutting tool are resolved thanks to the implementation of the control device proposed by the present invention to create the cutting program, and more particularly such a machine is freed of means aiming to correlate the actual position of the pattern relative to a theoretical position defined by a cutting program previously created on the reading of the printing medium by the reading means.

It will also be noted that such a cutting machine associated with printing means is preferably equipped with means of controlling the printing means, which implement printing programming means that in no way interfere with the means of programming the cutting control means. It will be noted, however, that definition information items and framing information items are likely to be extracted from memory means associated with the printing programming means of the inscription or inscriptions.

DESCRIPTION OF THE FIGURES

The present invention will be better understood, and details will become apparent, on reading the description that will be given of exemplary embodiments in relation to the figures of the appended plates, in which:

In FIG. 1 to FIG. 4, a control device is intended to operate a cutting tool 1 for a flat printing medium 2, on which have previously been printed an inscription, relating to at least one pattern 3 to be cut, even also to at least one identification mark 4 of this pattern. Such a printing medium 2 is represented in FIG. 2 to FIG. 4 and is notably intended to be placed on the table of a cutting machine equipped with a control device. Such a cutting machine, not represented in the figures, is of the type of those that comprise a cutting table or other device carrying the printing medium, such as a roll, which is topped by a chassis bearing mobility means 29 for the cutting tool 1 and optoelectronic reading means 5. Such reading means 5 are likely to be a scanner, of matrix or linear type, or even a camera, and/or a single-beam cell of the laser beam type able to detect a variation of contrast reflected by the printing medium, or other similar appliance.

In FIG. 1, the control device provokes an operation of the mobility means 29 for the cutting tool 1, from a cutting program 6 relating to vector information. The generation of the vector information of the cutting program 6 is performed by transcription means 7 from cutting data 8 transmitted by learning means 9. These cutting data 8 correspond to at least one outline C to be cut which is fundamentally defined from reading information items 10 transmitted by the reading means 5 from an optical scan of the surface of the printing medium 2. The reading information items are transmitted to the learning means 9 and are processed by recognition means 11 that isolate from the reading information items 10 those that relate to at least the inscription.

Figure 1:
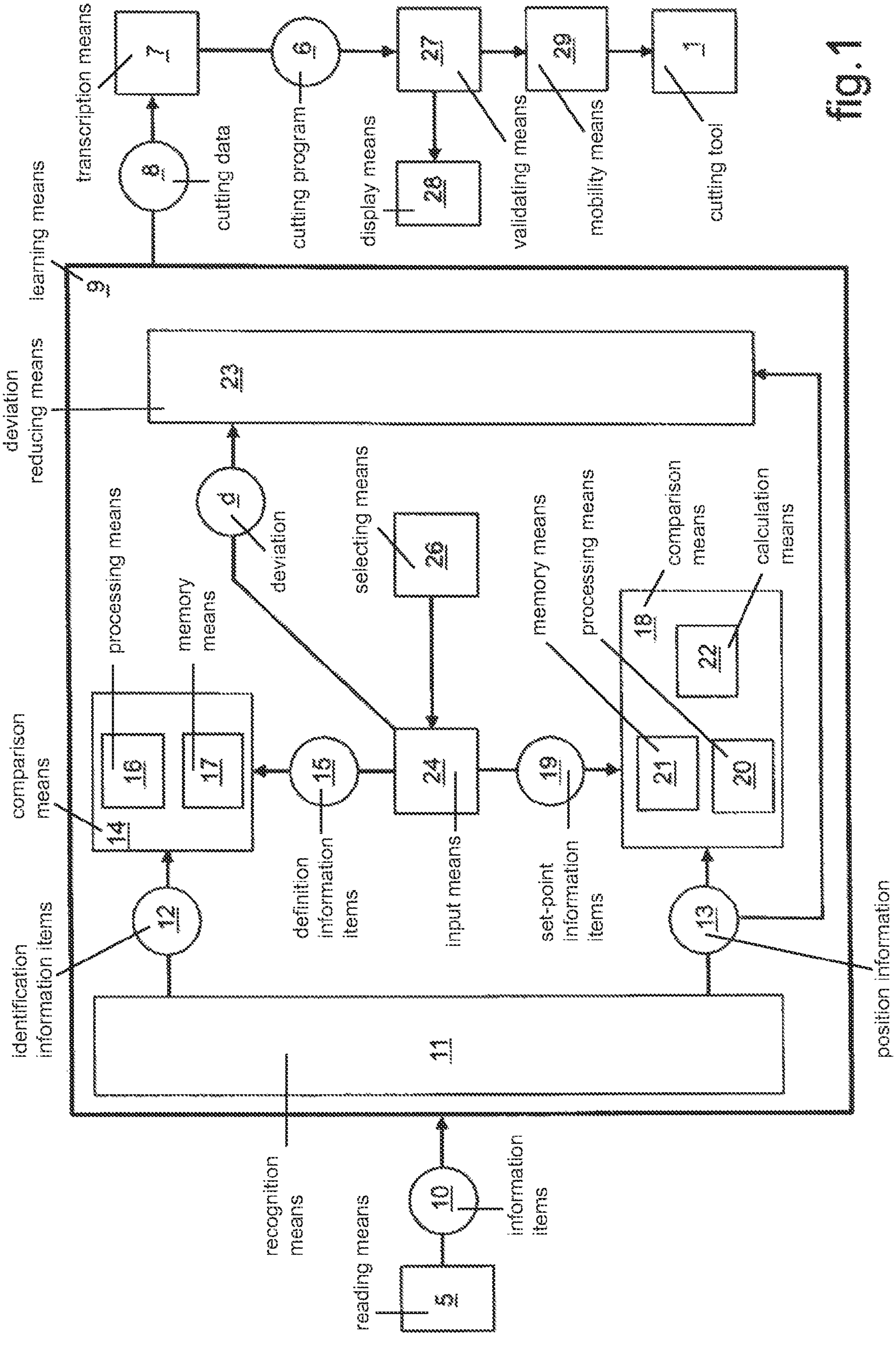
FIG. 1 is a diagram illustrating a control device of a tool for cutting a flat printing medium according to a preferred embodiment of the present invention.

The reading information items transmitted to the recognition means 11 consist of information items relating to the pattern 3 and to the identification mark 4. The information items relating to the identification mark 4 mainly consist of identification information items 12 and position information items 13, the latter information items 13 comprising information on the relative position of the identification mark 4 relative to the pattern 3.

Figure 2:
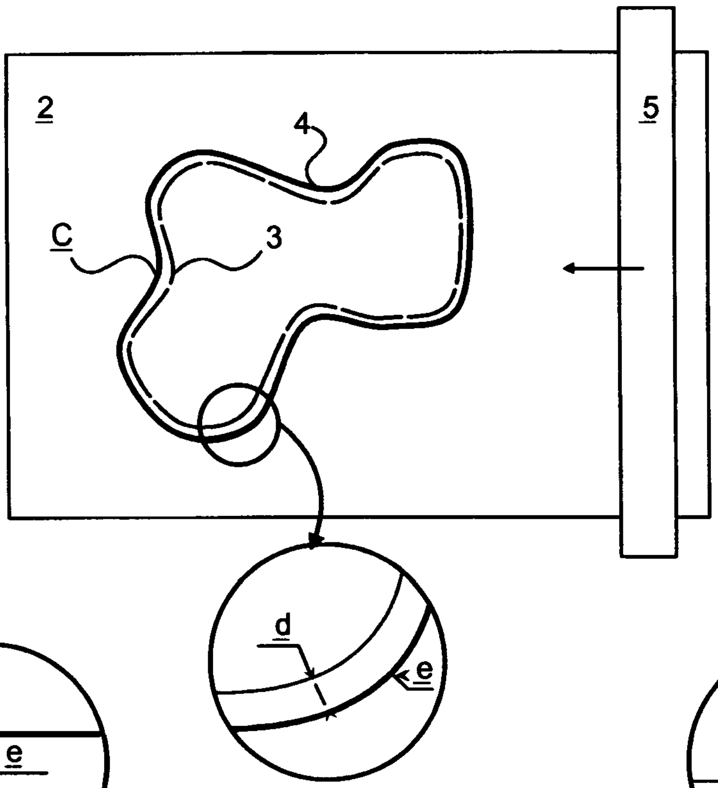
FIG. 2 to FIG. 4 are diagrams respectively illustrating different exemplary applications of a method of implementing the control means represented in FIG. 1.
Figure 3:
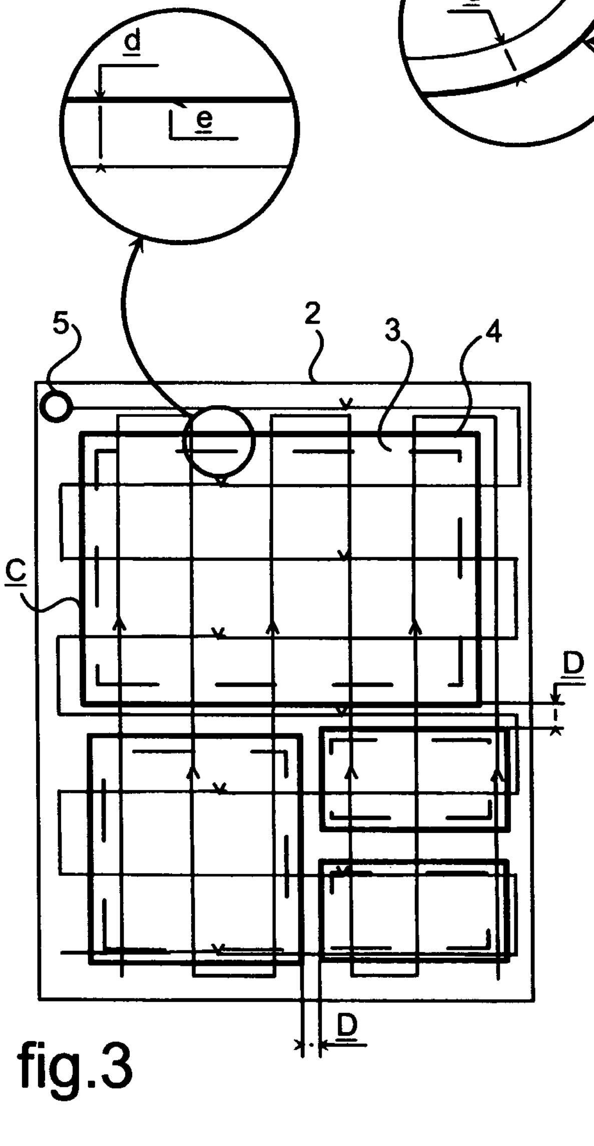
Figure 4:
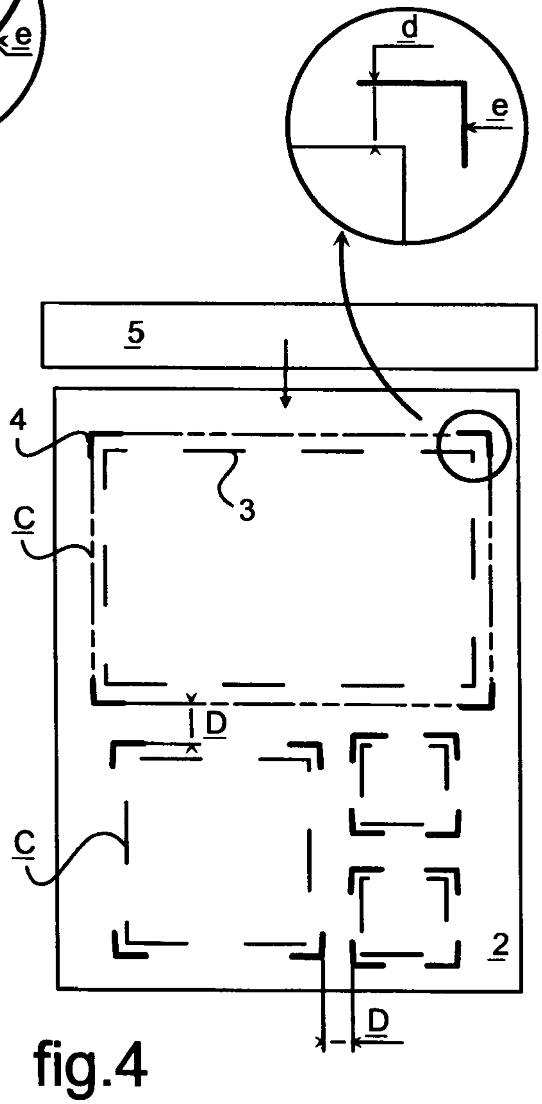

More specifically, referring to FIG. 2 to FIG. 4, the identification information items 12 notably relate to the thickness e of the line of the identification mark 4 and/or to its outline C defined by its form. The position information items relating to the identification mark 4 relative to the pattern 3 notably relate to a deviation d separating them from each other. The position information items 13 notably relate to a separation distance D of a plurality of identification marks 4 between themselves. The position information items define, for example, an outline C to be cut, such as in FIG. 4, and/or at least one separation distance D between two neighboring outlines C, such as in FIG. 3 and FIG. 4. Such a distance D is likely to be unique and identical from any one to any other of two adjacent outlines C, or to be respective to each of the general directions of the printing medium 2, or even to be respective from one to another of different adjacent outlines C.

Such reading information items relating to the identification mark 4 are collected by the reading means 5 from their displacement along the surface of the printing medium 2. In the case, for example, of a linear scanner represented in FIG. 2 and FIG. 4, the scan is performed according to one of the general directions of the printing medium 2, the other general direction being covered by the extent of the scanner. In the case, for example, of a matrix scanner or of a camera as represented in FIG. 3, the scan is performed according to a plurality of trajectories according to the two general directions of the printing medium 2. The deviation between each of these trajectories is likely to be determined by an operator from the input of such a desired deviation. According to a refined embodiment, such a deviation is likely to be determined automatically by specific means associated with the recognition means from a detection of contrast variation.

Returning to FIG. 1, the recognition means 11 are associated with first comparison means 14 between the identification information items 12 and similar definition information items 15. These first comparison means 14 are associated with first means 16 of processing the identification information items 12, in order to extract them from the reading information items 10 transmitted to the recognition means 11. Such an extraction is performed by the first processing means 16 from a comparison between the reading information items 10 and the definition information items 15 previously stored in memory by the first memory means 17.

The recognition means are also associated with second comparison means 18 between the position information items 13 and the similar framing information items 19. These second comparison means 18 are associated with second means 20 of processing the position information items 13, in order to extract them from the reading information items 10 transmitted to the recognition means 11. Such an extraction is performed by the second processing means 20 from a comparison between the reading information items 10 and the framing information items 19 previously stored in memory by second memory means 21. The second comparison means 18 are associated, notably via second processing means 20, with probability calculation means 22 between the position information items 13 and a plurality of framing information items 19. More particularly, and also referring to FIG. 3 and FIG. 4, the identification marks 4 define a plurality of outlines C to be cut. In FIG. 3, the identification marks 4 directly define an outline C to be cut in as much as these identification marks 4 are closed in a loop on themselves, whereas in FIG. 4, several identification marks 4 are associated to define one and the same outline C. The probability calculation means 22 make it possible to define the position of the different outlines C from an input by an operator of presence information items relating to the number, the form and/or the size of the different outlines C likely to be present on the printing medium 2. These presence information items notably correspond to framing information items 19.

The control means comprise means 23 of reducing the relative position deviation of the identification mark 4 relative to the pattern 3. These deviation reduction means 23 are intended to correct the vector information items created by the transcription means 7 according to the separation distance d between the identification mark 4 and the pattern 3. Such a correction is likely to occur immaterially either prior to the transmission of the cutting data 8 to the transcription means 7, or after this transmission from a correction of the vector data created by the transcription means 7.

The definition information items 15 and the framing information items 19 likely to comprise, where appropriate, the separation distance d, are defined by an operator who has input means 24, advantageously associated with means 26 of selecting information items to be input via menus or similar.

The control device also comprises means 27 of validating the cutting program 6 created by the transcription means 7, which are associated with means 28 of displaying the outline or outlines C corresponding to the vector information items of the cutting program 6.

Figure 5:
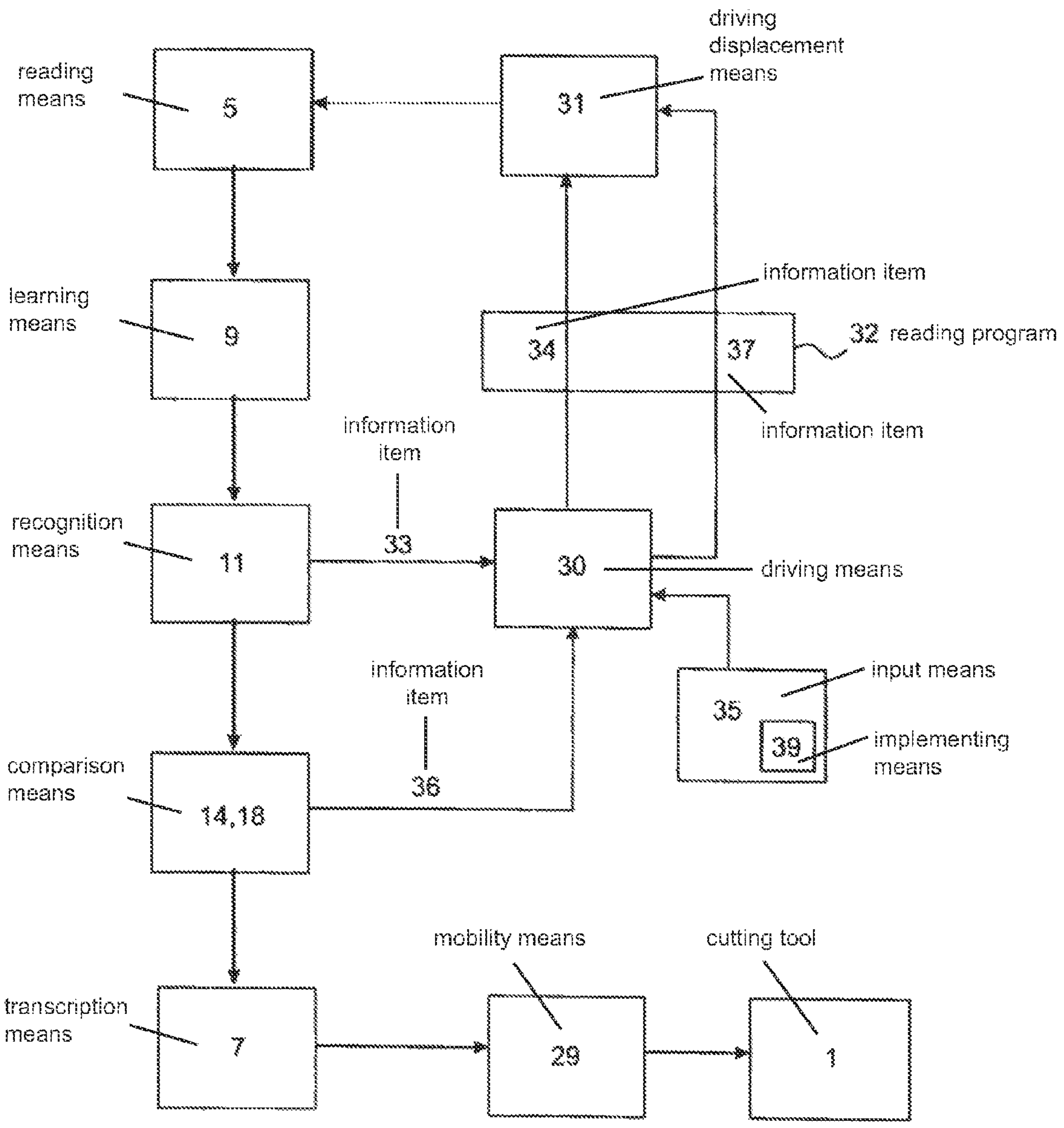
FIG. 5 is a diagram illustrating an advantageous organization of the means used for the learning of reading information relating to inscriptions and/or patterns that are printed on the printing medium and that are to be cut.

In FIG. 5, the reading means 5 transmit reading information items 10 to the learning means 9 associated with the recognition means 11. These recognition means 11 make it possible to identify the presence or the absence of a reading information item 10 revealing an inscription, such as a pattern 3 to be cut or an identification mark 4 of this pattern, for example. In the exemplary case where the reading means 5 are of the optoelectronic type, the recognition means 11 are able to identify the presence or the absence of a reading information item 10 revealing an inscription 3,4 from the detection of brightness contrast on the printing medium and/or a density of pixels.

Figure 6:
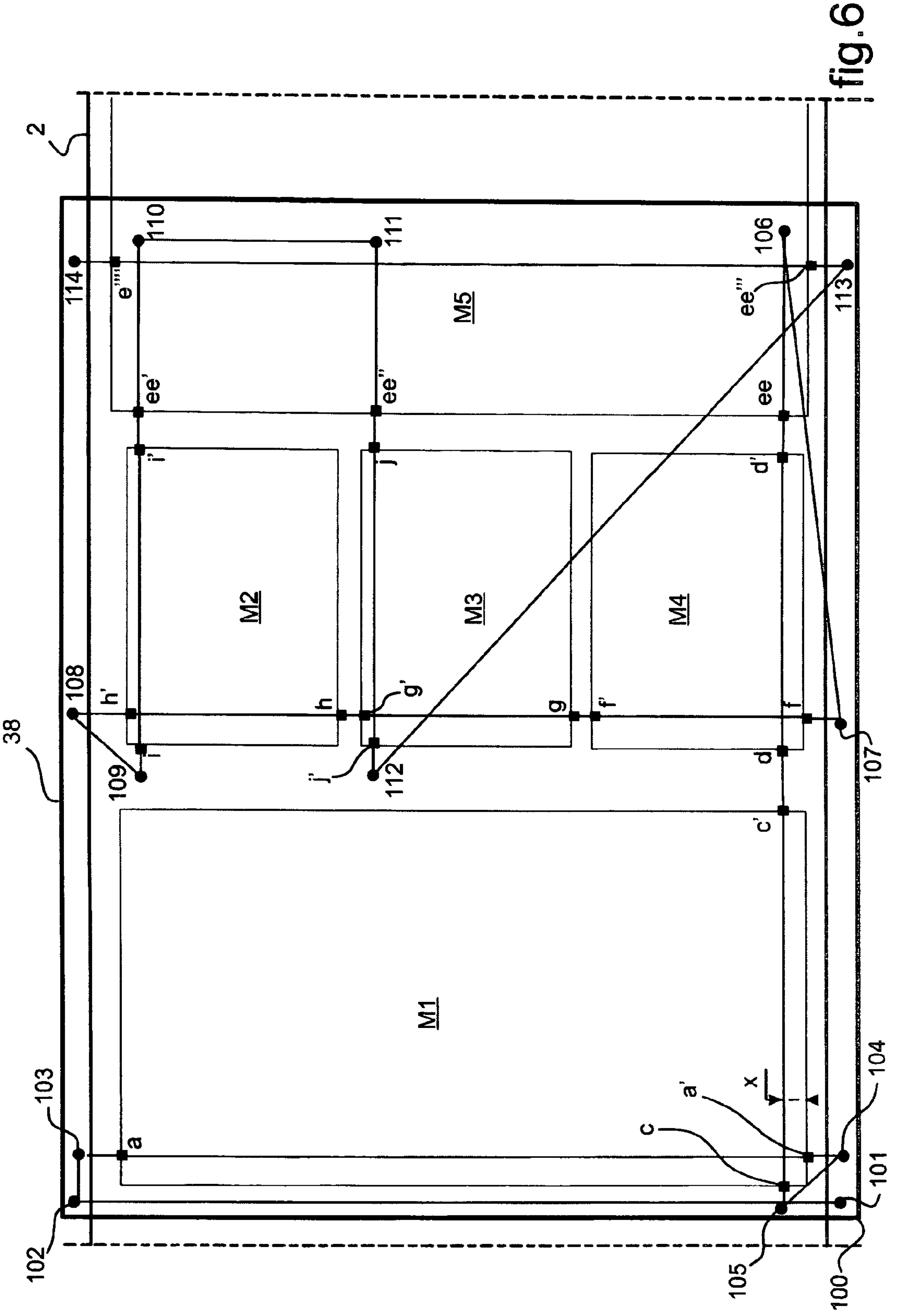
FIG. 6 and FIG. 7 are successive diagrams illustrating an example of execution of a learning of the inscriptions and/or patterns implementing the means represented in FIG. 5.
Figure 7:
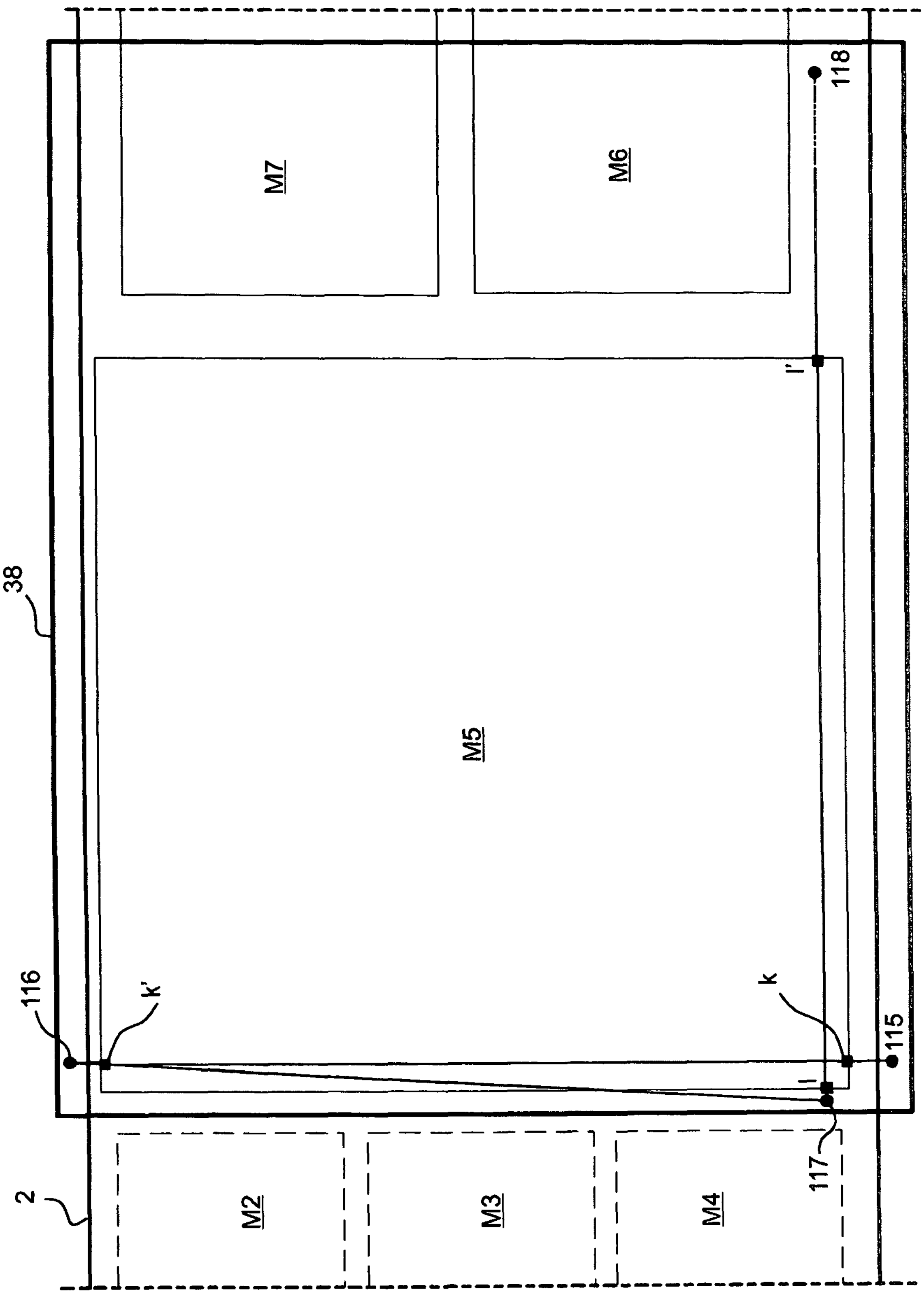

The device comprises means 30 of driving displacement means 31 for the reading means 5 and/or for the carrying device for the printing medium, the latter being referenced 38 in FIG. 6 and FIG. 7. The implementation of these driving means 30 is placed under the dependency of the recognition means 11, and of the comparison means 14,18. The driving means 30 generate a reading program 32 which consists of vector reading information items able to provoke the implementation of the displacement means 31. The diagram also shows the transcription means 7 which generate the cutting program 6 from cutting data 8 originating from the comparison means 14,18 to control the mobility means 29 of the cutting tool 1.

In the case where the reading information items 10 reveal an absence of inscription 3,4, a corresponding information item 33 is supplied to the driving means 30 by the recognition means 11. The driving means 30 generate a vector reading information item 34 corresponding to a predetermined step and/or direction. This step and this direction are likely to be stored in memory by the device either in the workshop, or from input means 35 available to the operator. These input means 35 also comprise means 39 of deliberately implementing the learning means 9 by the operator, which are able to provoke such an implementation in the case where the driving means 30 induce by default a command to displace the reading means 5 exempted from acquisition of reading information items 10 by the learning means 9.

In the case where the reading information items 10 reveal a presence of inscription or of pattern 3,4, this reading information item 10 is confronted with the set-point information 15,19,*e*,*d*,D,C via comparison means 14,18. With the inscription having been identified and recognized, a corresponding information item 36 is supplied to the driving means 30 by the comparison means 14,18. The driving means 30 generate a vector reading information item 37 corresponding to a distance and/or a direction provoking the displacement of the reading means 5 and/or of the carrying device 38 for the printing medium 2. According to the requirements, the learning means 9 are implemented or not on displacements provoked by the driving means 30, with the advantage of making it possible to generate the cutting program 6 without having to analyze all of the surface of the printing medium 2. More particularly, the driving means 30 are able to generate vector reading information items 34,37, and, consequently, a reading program 32, and to selectively control the implementation of the learning means 9 and/or recognition means 11 and/or comparison means 14,18 according to one or more reading information items 10 previously processed by the recognition means 11 and/or by the comparison means 14,18 on one and the same cycle for analyzing the surface of the printing medium 2. The generation of the reading program 32 is performed progressively according to the reading information items 10 previously processed. Certain displacements of the reading means 5 and/or of the carrying device 32 for the printing medium 2 are likely to be performed rapidly when the learning means 9 and/or the recognition means 11 and/or the comparison means 14,18 are not implemented on these displacements. Such an absence of implementation is permitted without affecting the generation of the cutting program 6 thanks to the prior confrontation on these displacements of the reading information items 10 with the set-point information items 15,19,*d*,*e*,D,C.

In FIG. 6 and FIG. 7, the device is used to cut patterns M1 M2 M3 M4 M5 M6 M7 printed on the printing medium 2. A preferred, but not restrictive, application lies in the cutting of photographs in market-standard formats.

In FIG. 6, the operator places the printing medium 2 on the carrying device 38. This operation is preferably performed by covering as much as possible of the carrying device 38 by the printing medium 2, taking care that the patterns to be cut are best arranged in the reading and cutting surface covered by the possible displacements of the reading means 5 and the tool 1. On the exemplary embodiment illustrated, the carrying device 38 for the printing medium 2 is arranged on a table and only the reading means 5 can be displaced to detect the reading information items 10. According to variants not represented, the table is likely to move displacement-wise by being operable by the mobility means 29, in isolation or together with the reading means 5, or even the carrying device 38 for the printing medium 2 has a vertical extension and is mobile whereas the reading means 5 are fixed. Other embodiment variants of the carrying device 38 for the printing medium 2 and/or of the relative mobility methods between the printing medium 2 and the cutting tool 1 and/or reading means 5 are possible without departing from the rules defined for the methods of generating the cutting program 6 and the reading program 32 proposed by the present invention.

The operator inputs the set-point information items, and more particularly in the exemplary case, the formats of the patterns M1 M2 M3 M4 M5 M6 M7 to be cut. Such set-point information items are likely to be already present in memory and are input only in case of need according to the patterns to be cut. If necessary, the operator can select formats that the reading means 5 are likely to detect and/or their number. The latter operation is not mandatory, the learning means and the recognition means, associated with the comparison means, being able to detect the different patterns to be cut for which the set-point information items are stored in memory by the memory means of the device. However, this operation makes it possible to reduce the number and the density of the calculation operations that the device must carry out to identify the different formats of the patterns to be cut. All of the information items input by the operator form a database relating, for example, to formats, geometrical forms, thicknesses of lines bordering the patterns to be cut, even potential separation distances between this line and a pattern or between two adjacent patterns or inscriptions, without prejudging a cutting program 6 and a reading program 32 to be generated during a learning cycle. The information items from the database are used not only for dimensional accuracy when cutting the patterns, but also to drive the displacement means 31, by avoiding implementing the learning means 9 when this is not necessary to identify and locate the pattern or patterns to be cut. On completion of a trajectory traveled by the reading means 5 in association with the implementation of the learning means 9, the device is able to compare the reading information items 10 previously recognized as revealing the presence of an inscription and/or a pattern with the set-point information items 15,19,*d*,*e*,D,C, to deduce therefrom one or more suitable trajectories according to the inscriptions and/or the patterns identified and to deduce therefrom the need or otherwise to implement the learning means 9 in conjunction with this or these new trajectories.

The operator provokes a start of reading cycle aiming generate a reading program 32 and at the same time a cutting program 6. This operation is likely to be performed from a validation key or other similar all-or-nothing control unit.

A first trajectory 101-102 is by default close to an origin point 100, for example a starting point 101 situated at a distance of around 10 mm from the origin point 100. The position of this starting point 101 is likely to be parameterized previously by the operator. The system tries to detect the edges of the patterns and/or, where appropriate, a frame surrounding them. Any detection of a frame provokes a cut command parallel to the edges of this frame by a value parameterizable by the operator. The cut is likely to be performed on the inside or outside boundary of the frame, or at any distance from the pattern inscribed in this frame. Such a cut parameter is likely to be input and/or selected previously by the operator. This first trajectory is performed at least according to all of one dimension of the printing medium or at least according to the greatest dimension of a pattern and/or of an inscription likely to be detected and whose format has previously been stored in memory as targeted above.

In the case where the first trajectory 101-102 does not reveal reading information relating to an inscription, the driving means generate a vector reading information item 34 to provoke a displacement of the reading means 5 according to a second trajectory to the point 103. This vector reading information item 34 relates to a step and/or to a direction previously parameterized, such as from an input and/or a selection performed by the operator, and the learning means 9 are not implemented.

Then, the driving means 30 generate a vector reading information item 37 to provoke a displacement of the reading means 5 according to a third trajectory to the point 104, the learning means being implemented. On this displacement of the reading means 5, reading information items a and a' are detected by the reading means 5, analyzed by the learning means 9 and the recognition means 11 associated with the comparison means 14,18. The device deduces the position of the point 105. This point 105 is situated between the first trajectory and the edge of the carrying device 38 for the printing medium 2, and is situated between the areas in extension of the points corresponding to the reading information items a-a'. A parameter x is likely to be previously input and/or selected by the operator to position the point 105 relative to the point a, and therefore relative to the edge of the pattern to be cut.

With the point 105 being deduced, the driving means 30 generate a vector reading information item 34 to provoke a displacement of the reading means 5 according to a fourth trajectory to the point 105. By default, the learning means 9 are not implemented, but the operator can order their implementation from means 39 of deliberately implementing the learning means 9. Then, the driving means 30 generate a vector reading information item 37 to provoke a displacement of the reading means 5 according to a third trajectory to the point 106, the learning means 9 being implemented. On this displacement of the reading means 5, reading information items c,c',d,d',ee are detected and analyzed by the learning means 9 and the recognition means 11 associated with the comparison means 14,18. The format of the pattern M1 is identified, and a dimension of the pattern M4 is identified. Moreover, the reading information item ee reveals the presence of a pattern M5 partially situated on the carrying device 38 for the printing medium 2. It will be noted that, from a single detected dimension of a pattern and from set-point information items relating to the potential format and/or to the number of the patterns, their position and/or their distribution on the printing medium can be deduced by the learning means 9 and the recognition means 11 associated with the comparison means 14,18. It follows from this that calculation operations are further saved and that the reading process can be accelerated without affecting the generation of the cutting program 6 obtained from the learning means 9.

The reading means 5 having covered a dimension of the printing medium 2 limited to a dimension of the carrying device 38, the learning continues according to similar methods of the technique that has just been stated:

to the point 107 without learning, to the point 108 with learning and detection of the reading information f-f', g-g' and h-h' respectively revealing the position and a dimension of the patterns M3 and M2 and the other dimension of M4.

to the point 109 without learning, to the point 110 with learning and detection of the reading information ii' revealing the other dimension of the pattern M2 and ee' revealing the presence of the pattern M5.

to the point 111 without learning, deduced from the knowledge of the first dimension of M2, to the point 112 with learning and detection of the reading information ee" relating to M5 and j-j' revealing the other dimension of the pattern M3.

to the point 113 without learning.

to the point 114 with learning and detection of the reading information ee'"-ee"" relating to M5.

All of the surface of the printing medium 2 accessible by the displacement means 31 of the reading means 5 having been covered, the cutting program 6 is generated and the cutting of the patterns M1, M2, M3 and M4 is carried out. Since the pattern M5 is only partially detected, it is not cut.

In FIG. 7, the printing medium 2 is displaced relative to the carrying device 38. The partially detected pattern M5 is placed at the limit of the area accessible by the reading means 5 and by the cutting tool 1. This area limit is likely to be reduced by a previously parameterized value. The learning continues according to the similar methods of the technique that has just been stated:

to the point 115 without learning, to the point 116 with learning and detection of the reading information k-k' relating to a first dimension of M5, to the point 117 without learning, to the point 118 with learning and detection of the reading information I-I' relating to the second dimension of M5.

The learning cycle continues and the presence of the patterns M6 and M7 is detected and the pattern M5 is cut, in a manner similar to that stated previously. The starting displacements of the reading means 5 that are performed without learning of the reading information items 10, are provided for trajectories aiming to bring the reading means 5 to a starting position of a trajectory from which the reading means 5 are displaced with learning of the reading information items 10. It is advantageous for these starting displacements to be performed without learning of the reading information items 10 to enable the latter to be moved rapidly and to avoid unnecessary calculation operations. However, the device is preferably provided with means 39 of deliberately implementing the learning means 9 to enable the operator, if he wishes, to order the learning, the recognition and/or the comparison of the reading information items 10 detected on these starting displacements.

The device is able to cut a pattern of which at least one of the dimensions is greater than the possible surface area covered by the cutting tool 1. Such a pattern format can be identified or not from the prior input of the set-point information items. The device is able to identify the impossibility of cutting such a pattern in a cutting operation, that is, without having to displace the printing medium 2 accordingly. This identification is, for example, performed from the learning operation in itself and from the detection of the reading information items 10 revealing or not revealing an inscription 3,4 according to the concurrent trajectories traveled by the reading means 5. Such an identification is preferably associated with the confrontation of these reading information items with a set-point information item relating to the format of the pattern to be cut. From learning methods similar to those that have just been described, such a pattern is detected and the partial cutting operation can be ordered. The medium is then displaced relative to the mobility means 29 of the cutting tool 1, and the learning continues according to methods similar to those previously described to complete its cutting.

It will be noted that the learning and cutting methods described in relation to FIG. 6 and FIG. 7 are not exhaustive, but must be considered to reveal advantages obtained by the present invention regarding the means implemented for such a learning and for such a cutting of patterns. These methods can be transposed for any patterns to be cut from an implementation of the learning means 9 associated with recognition means 11 and comparison means 14,18 as proposed by the present invention.

The invention claimed is:

1. A control device for i) operating a cutting tool (1) for cutting a flat printing medium (2) having previously printed inscriptions (3, 4) relating to a pattern (3) to be cut and an identification mark (4) of the pattern to be cut, the identification mark printed in proximity to the inscriptions, and ii) operating a carrying device (38) carrying the printing medium (2), the control device being adapted for fitting on a machine for cutting the printing medium (2), the control device comprising:

reading means (5) configured to read the printing medium (2) for the previously printed inscriptions (3, 4) for ii) identification of a position of the identification mark (4) from a detection a density of pixels, the reading means (5) providing reading information items (10) as an output;

learning means (9) associated with the reading means (5) and receiving the reading information items (10) output from the reading means (5), the learning means configured for providing cutting data (8), the learning means comprising a recognition means (11) and a comparison means (14, 18), the recognition means (11) configured to receive the reading information items (10) and therefrom recognize identification information items (12) and provide position information items (13) relating to the inscriptions (3, 4) previously printed on the medium (2), the comparison means (14, 18) comprising a memory with previously stored set-point information (15,19,*e*,*d*,D,C) relating to at least one of i) a definition of the inscriptions (3,4) and ii) framing information related to a separation distance (d,D), the comparison means (14,18) configured to compare respectively the identification information items (12) and the position information items (13) with the set-point information (15,19,*e*,*d*,D,C) based on the at least one of i) the density of pixels, and ii) framing information from a relative position between at least two of the inscriptions (3,4), the cutting data being based on results of the comparison;

transcription means (7) configured to receive the cutting data (8) and to generate vector information;

a cutting program (6) configured to receive the generated vector information for movement of at least the one of i) the cutting tool (1), and ii) the carrying device, the movement for creating a cutting program (6) based on the reading information items (10) of the reading means (5); and mobility means (29) for controlling movement, based on the cutting program (6) and the received vector information, of the one of i) the cutting tool (1) and ii) the carrying device.

2. The control device as claimed in claim 1, wherein, the comparison means (14, 18) configured to compare the reading information items (10) identifying any one inscription (3, 4) with the at least one of i) the definition of the inscriptions (3,4) and ii) the framing information to deduce from this comparison vector cutting information relating to the displacement of the one of i) cutting tool (1) and ii) the carrying device for the printed medium (2).

3. The control device as claimed in claim 1, wherein the recognition means (11) comprising:

a first comparison means (14) i) at an output of the recognition means (11) providing the identification information items (12) and ii) receives the set-point information (15,*e*) comprising the definition of the inscriptions, and a second comparison means (18) i) at an output of the recognition means (11) providing the position information items (13) and ii) receives the set-point information relating to the separation distance (d,D) between at least two inscriptions (3,4) and an outline (C) to be cut, and the framing information (19) previously stored in memory relating to the separation distance (d,D).

4. The control device as claimed in claim 3, wherein the second comparison means (18) comprises a probability calculation means (22) utilizing the position information items (13) and a plurality of the framing information items (19) previously successively stored in the memory.

5. The control device as claimed in claim 3, wherein at least one of the first comparison means (14) and the second comparison means (18) is associated with an operator input means (24) of input information relating to at least one of definition information items (15) and the framing information items (19) of the set-point information.

6. The control device as claimed in claim 5, wherein the input means (24) is associated with an operator selection means (26) for selecting at least one input information item out of a plurality of input information items previously stored in memory.

7. The control device as claimed in claim 1, wherein the learning means further comprises means (23) for reducing a deviation of a relative position between at least one identification mark (4) and a corresponding pattern (3).

8. The control device as claimed in claim 1, wherein the recognition means (11) is configured for identifying reading information relating immaterially to the pattern (3) and at least one identification mark (4) of said pattern (3).

9. The control device as claimed in claim 1, further comprising:

driving means (30) for driving displacement of at least one of i) the reading means (5) and ii) the carrying device (38), the driving means using a reading program (32) relating to vector reading information (34, 37), wherein the driving means (30) is associated with the learning means (9) and is configured to generate the vector reading information (34, 37) from at least one of the reading information items (10) previously detected during a current learning cycle and compared with the set-point information (15,19,*d,e*,C,D).

10. The control device as claimed in claim 9, wherein the driving means (30) is associated with the comparison means (14,18) and is configured to generate the vector reading information item (34,37) from the comparison between the one reading information item (10) and at least one set-point information item (15,19,*e*,*d*,D,C).

11. The control device as claimed in claim 9, wherein the driving means (30) is configured to generate a new vector reading information item (34) corresponding to at least one of i) a step and ii) a predetermined direction from at least one of the reading information items (10) revealing an absence of any inscription, and is further configured to generate another new vector reading information item (37) corresponding to at least one of i) a distance and ii) a direction deduced by comparison between at least one of the reading information items (10) revealing an inscription and compared with the set-point information (15,19,*e*,*d*,D,C).

12. The control device as claimed in claim 9, further comprising a implementing means (39) for implementing the learning means (9) by an operator on a displacement of the reading means (5).

13. A machine for cutting at least one pattern (3) printed on a flat printing medium (2), comprising the control means claimed in claim 1.

14. The cutting machine as claimed in claim 13, wherein the reading means (5) is one of an optoelectronic reader and an electromagnetic reader.

15. The cutting machine as claimed in claim 13, in combination with a printing means for printing on the printing medium (2) the inscriptions (3,4).

16. A method for cutting a flat printing medium (2) around a pattern (3) previously printed on the printing medium (2), the method comprising:

a preliminary step of printing inscriptions (3, 4) relating to the pattern (3) to be cut and an identification mark (4) of the pattern to be cut, the identification mark printed in proximity to the inscriptions;

using a control device for i) operating a cutting tool (1) for cutting the flat printing medium (2), and ii) operating a carrying device (38) carrying the printing medium (2), the control device being adapted for fitting on a machine for cutting the printing medium (2), using the control device comprising using reading means (5) configured to read the printing medium (2) for the previously printed inscriptions (3, 4) for ii) identification of a position of the identification mark (4) from a detection a density of pixels, the reading means (5) providing reading information items (10) as an output, using learning means (9) associated with the reading means (5) and receiving the reading information items (10) output from the reading means (5), the learning means configured for providing cutting data (8), use of the learning means comprising using a recognition means (11) and a comparison means (14, 18), using the recognition means (11) to receive the reading information items (10) and therefrom recognize identification information items (12) and provide position information items (13) relating to the inscription (3, 4) previously printed on the medium (2), using the comparison means (14,18) comprising using a memory with previously stored set-point information (15,19,*e*,*d*,D,C) relating to at least one of i) a definition of the inscriptions (3,4) and ii) framing information related to a separation distance (d,D), using the comparison means (14,18) to compare respectively the identification information items (12) and the position information items (13) with the set-point information (15,19,*e*,*d*,D,C) based on the at least one of i) the density of pixels, and ii) framing information from a relative position between at least two of the inscriptions (3,4), the cutting data being based on results of the comparison, using transcription means (7) configured to receive the cutting data (8) and to generate vector information, using a cutting program (6) configured to receive the generated vector information for movement of at least the one of i) the cutting tool (1), and ii) the carrying device, the movement for creating a cutting program (6) based on the reading information items (10) of the reading means (5), and using mobility means (29) for controlling movement, based on the cutting program (6) and the received vector information, of the one of i) the cutting tool (1) and ii) the carrying device;

performing a read of the surface of the printing medium (2) from a displacement of one of the reading means (5) and of the carrying device along the surface to obtain reading information (10);

transmitting the reading information (10) to the learning means (9) to generate the cutting data (8) relating to identification items (12) or positioning information items (13) of the inscriptions (3,4), transmitting the cutting data (8) to the transcription means (7) to generate the cutting program (6), with the vector information, by identifying the outline (C) to be cut, and controlling the mobility means (29) from the vector information of the generated cutting program (6).

17. The method for cutting a flat printing medium as claimed in claim 16, comprising an initial step, prior to the transmitting step of transmitting the cutting data (8) to the transcription means (7), of storing in memory the set-point information.

18. The method for cutting a flat printing medium as claimed in claim 16, comprising the sub-steps of:

detecting a first reading information item (10) relating to an inscription (3,4), comparing the first reading information item (10) with at least one set-point information item (15,19,*e*,*d*,D,C) and deducing therefrom a vector reading information item (34,37).

19. The method for cutting a flat printing medium as claimed in claim 18, wherein, from an initial positioning of one of i) the reading means (5) and ii) the carrying device (38), the further steps of:

generating a first vector reading information item (101, 102) and transmitting the first vector reading information item to the learning means (9) to deduce therefrom a presence or absence of an inscription (M1), in case of an absence of the inscription (M1), generating a second vector reading information item (102,103) according to a predetermined step or a direction, by one of i) default without acquisition of further reading information items (10), ii) selectively by the operator with acquisition of the reading information (10), and generating a third vector reading information item (103,104) by transmitting to the comparison means (14,18) the reading information (a-a') acquired to deduce therefrom the presence or absence of the at least one inscription (M1), in case of a presence of the inscription (M1), comparing the reading information (a-a') with at least one of the setpoint information items (15,19,*e*,*d*,D,C) and generating a fourth vector reading information item (104,105) taking into account the presence of the inscription (M1) in light of the inscription's (M1) definition or framing and transmitting to the transcription means (7) the acquired reading information (a-a').

20. The method for cutting a flat printing medium as claimed in claim 19, wherein, the first vector reading information item (101-102) and the third vector reading information item (103-104) correspond to a displacement of the reading means (5) or of the carrying device (38) according to a first direction corresponding to at least one dimension of the flat printing medium (2), the second vector reading information item (102-103) and the fourth vector reading information item (104-105) correspond to a displacement of the reading means (5) or of the carrying device (38) for the printing medium (2) according to at least one second direction transversal to the first direction.

* * * * *